(12) United States Patent
Matsuura et al.

(10) Patent No.: US 9,762,760 B2
(45) Date of Patent: Sep. 12, 2017

(54) IMAGE PROCESSING APPARATUS, METHOD OF DISPLAYING OPERATION MODE KEYS FOR IMAGE PROCESSING APPARATUS, AND RECORDING MEDIUM

(75) Inventors: Tsumoru Matsuura, Toyohashi (JP); Eiichi Yoshida, Toyokawa (JP); Takatsugu Kuno, Toyokawa (JP); Kenichi Komaba, Toyokawa (JP); Taketoshi Yamahata, Toyokawa (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 392 days.

(21) Appl. No.: 13/030,572

(22) Filed: Feb. 18, 2011

(65) Prior Publication Data
US 2011/0209077 A1    Aug. 25, 2011

(30) Foreign Application Priority Data

Feb. 22, 2010 (JP) ................................. 2010-036711

(51) Int. Cl.
*G06F 3/0489* (2013.01)
*G06F 3/0482* (2013.01)
(Continued)

(52) U.S. Cl.
CPC ....... *H04N 1/00416* (2013.01); *H04N 1/0048* (2013.01); *H04N 1/00474* (2013.01);
(Continued)

(58) Field of Classification Search
CPC ... G06F 3/00; G06F 3/048; G06F 3/14; G06F 3/0483; G06F 3/0481; G06F 2340/12;
(Continued)

(56) References Cited

U.S. PATENT DOCUMENTS 5,565,964 A * 10/1996 Tashiro et al. .................. 399/83
6,828,992 B1 * 12/2004 Freeman et al. .............. 715/810
(Continued)

FOREIGN PATENT DOCUMENTS

JP    2000-079744 A    3/2000
JP    2002-361986 A   12/2002
(Continued)

OTHER PUBLICATIONS

Office Action (Notification of Reasons for Refusal) dated Dec. 13, 2011, issued in the corresponding Japanese Patent Application No. 2010-036711, and an English Translation thereof.

*Primary Examiner* — Doon Chow
*Assistant Examiner* — Le Nguyen
(74) *Attorney, Agent, or Firm* — Buchanan Ingersoll & Rooney PC

(57) ABSTRACT

An image processing apparatus comprises: a display that displays a first screen including one or more than one first key for setting a mode to execute a function of the apparatus, and then, if one of the first keys is pressed, displays a second screen including one or more than one second key, which is a lower-class screen under the pressed first key; and a customizing portion that hides at least one of the first and the second keys on the first screen, according to a user operation, and wherein if a user changes to non-display, the setting of at least one of the first keys on the first screen, while there exists a second key preliminarily prohibited from being hidden, on the second screen that is a lower-class screen under the first key to be hidden according to the changed setting, the customizing portion doesn't hide the first key.

13 Claims, 14 Drawing Sheets

(51) Int. Cl.
*G06F 21/31* (2013.01)
*G06F 3/0484* (2013.01)
*H04N 1/00* (2006.01)
G06F 3/01 (2006.01)
G06F 21/30 (2013.01)
G06F 17/30 (2006.01)

(52) U.S. Cl.
CPC ..... *H04N 1/00477* (2013.01); *H04N 1/00482* (2013.01); *H04N 1/00514* (2013.01); *G06F 3/01* (2013.01); *G06F 17/30* (2013.01); *G06F 21/30* (2013.01)

(58) Field of Classification Search
CPC ............... G06F 3/04842; G06F 3/0237; G06F 2340/0407; G06F 3/0482; G06F 3/0485; G06F 3/04817; G06F 3/04847; G06F 3/04886; G06F 3/0489; G06F 3/04812
USPC ........ 715/744, 764–768, 811, 866, 713, 864, 715/747
See application file for complete search history.

(56) References Cited

U.S. PATENT DOCUMENTS

| | | | |
|---|---|---|---|
| 7,117,444 B2* | 10/2006 | Takao et al. | 715/740 |
| 7,325,203 B2* | 1/2008 | Katano | 715/765 |
| 7,580,943 B2* | 8/2009 | Sakura et al. | |
| 7,619,762 B2* | 11/2009 | Chavers et al. | 358/1.15 |
| 7,983,402 B2* | 7/2011 | Ohara et al. | 379/102.02 |
| 8,223,400 B2* | 7/2012 | Funane | 358/1.9 |
| 2002/0015598 A1* | 2/2002 | Maeda et al. | 399/81 |
| 2004/0183836 A1* | 9/2004 | Pagan | 345/810 |
| 2005/0055306 A1* | 3/2005 | Miller et al. | 705/37 |
| 2006/0048060 A1* | 3/2006 | Mohr et al. | 715/747 |
| 2006/0083533 A1* | 4/2006 | Maeshima | 399/82 |
| 2006/0282454 A1* | 12/2006 | Hernandez-Sherrington et al. | 707/102 |
| 2007/0146759 A1* | 6/2007 | Saito | 358/1.13 |
| 2007/0176946 A1* | 8/2007 | Matoba | 345/619 |
| 2007/0198949 A1* | 8/2007 | Rummel | 715/810 |
| 2007/0198954 A1* | 8/2007 | Dinn | 715/864 |
| 2007/0216965 A1 | 9/2007 | Yoshihama | |
| 2007/0234086 A1* | 10/2007 | Bernstein | G06F 9/4418 713/310 |
| 2007/0250795 A1* | 10/2007 | Park | 715/864 |
| 2008/0074694 A1* | 3/2008 | Saida | 358/1.15 |
| 2008/0144087 A1* | 6/2008 | Mitsui | 358/1.15 |
| 2008/0246992 A1* | 10/2008 | Yamamichi | 358/1.15 |
| 2008/0307329 A1* | 12/2008 | Endoh | 715/762 |
| 2008/0320406 A1 | 12/2008 | Fukada et al. | |
| 2009/0031254 A1* | 1/2009 | Herpel et al. | 715/840 |
| 2009/0063659 A1* | 3/2009 | Kazerouni et al. | 709/219 |
| 2009/0064002 A1* | 3/2009 | Katsumata et al. | 715/762 |
| 2009/0138802 A1 | 5/2009 | Yamashita | |
| 2009/0199109 A1 | 8/2009 | Doui | |
| 2009/0225346 A1* | 9/2009 | Tokuda | 358/1.13 |
| 2009/0287682 A1* | 11/2009 | Fujioka et al. | 707/5 |
| 2009/0300529 A1* | 12/2009 | Endoh et al. | 715/764 |

FOREIGN PATENT DOCUMENTS

| | | |
|---|---|---|
| JP | 2007-109114 A | 4/2007 |
| JP | 2007-249863 A | 9/2007 |
| JP | 2007-279894 A | 10/2007 |
| JP | 2009-004970 A | 1/2009 |
| JP | 2009-181376 A | 8/2009 |
| JP | 2009-289022 A | 12/2009 |

* cited by examiner

| Key ID | Key Name | Screen | Lower-class Screen | Display/Non display | Function Group |
|---|---|---|---|---|---|
| 1 | Printed Surface | ① | ② | Display | A |
| 2 | Print Paper | ① | ③ | Display | B |
| 3 | Finish | ① | ④ | Display | C |
| 4 | Single-sided | ② | - | Display | D |
| 5 | Double-sided | ② | - | Display | E |

FIG.6

| Key ID | Key Name | Screen | Lower-class Screen | Display/Non display | Function Group |
|---|---|---|---|---|---|
| 1 | Printed Surface | ① | ② | Non-Display | A |
| 2 | Print Paper | ① | ③ | Display | B |
| 3 | Finish | ① | ④ | Display | C |
| 4 | Single-sided | ② | - | Display | D |
| 5 | Double-sided | ② | - | Display | E |

FIG.7

| Key ID | Number of Times of Use | Date and Time of the Last Use | User of the Last Use |
|---|---|---|---|
| 1 | 5 | 20080106 | Bob |
| 2 | 0 | – | – |
| 3 | 2 | 20010912 | John |
| 4 | 3 | 20090326 | Public User |
| 5 | 0 | – | – |

IMAGE PROCESSING APPARATUS, METHOD OF DISPLAYING OPERATION MODE KEYS FOR IMAGE PROCESSING APPARATUS, AND RECORDING MEDIUM

This application claims priority under 35 U.S.C. §119 to Japanese Patent Application No. 2010-036711 filed on Feb. 22, 2010, the entire disclosure of which is incorporated herein by reference in its entirety.

BACKGROUND OF THE INVENTION

Field of the Invention

The present invention relates to image processing apparatuses such as image forming apparatuses, allowing users to customize a key selection screen displayed on a display of an operation panel for example, so as to facilitate their selecting from a plurality of operation mode keys to set an operation mode, via the screen; methods of displaying the operation mode keys; and computer-readable recording mediums having a display control program stored thereon to make a computer execute processing.

Description of the Related Art

The following description sets forth the inventor's knowledge of related art and problems therein and should not be construed as an admission of knowledge in the prior art.

The image processing apparatuses of recent years, for example multifunctional digital image forming apparatuses that are also called MFPs (Multi Function Peripherals), have gotten a lot of functions. Such an image processing apparatus displays operation mode keys to set an operation mode for each of the functions, on a key selection screen on a display of an operation panel thereof.

The multifunctional machines of recent years have constantly been developed in terms of multi-functionality in order to meet requirements for various patterns of use, and accordingly more and more operation mode keys have been provided onto a screen.

Many users tend to use only basic ones among the functions installed on an image forming apparatus, or they unconsciously use some fixed ones among those, depending on the environment using the image forming apparatus and their jobs there. However, with too many operation keys, including necessary and unnecessary ones being in a mixed manner on a screen of the operation panel, it is quite troublesome to differentiate one from another and perform more operations to complete the setting for a target function. That is more troublesome specifically for entry-level users, and administration-level users would need to train or support such users to become self-reliant, which could cause an increase of administration costs. From the aspect of cost saving, now administration-level users are requesting for an image forming apparatus with fewer functions.

To meet such a requirement, there has already been developed a technology to allow customizing a screen so as not to display thereon an unnecessary operation mode key (Japanese Patent Publication No. 2002-361986, for example).

With this technology for customization, the number of operation mode keys displayed on one key selection screen can be reduced by changing the settings of some of the keys, from display to non-display.

Furthermore, there has already been known another technology to allow customizing a screen of an operation panel so as to remove an unnecessary function therefrom or gray it out (Japanese Patent Publication No. 2007-249863, for example).

However, administration-level users do not always understand all the functions installed on an image processing apparatus, correlations among them, use of them and the like. Therefore, if the image processing apparatus is configured so as not to display some of the operation mode keys exactly as what is requested by administration-level users, the users other than the administration-level users hardly could find operation mode keys for setting their target function as to be described below, which has brought another trouble in user-friendliness.

In other words, usually, there is a limit to a display area of the screen of the image processing apparatus, and also to how many operation mode keys can be included in one key selection screen. Thus, in general, operation mode keys are displayed on a plurality of key selection screens that are organized in a tree structure.

In this case, operation mode keys provided onto a key selection screen and those provided onto its higher-class key selection screen are not always used in a set of operations. Some operation mode keys are provided onto a key selection screen from the aspect of usefulness, for example, those may be frequently used together with the other operation mode keys provided onto the same screen. Alternatively, a plurality of operation mode keys for setting a plurality of independent functions may be provided onto a key selection screen as a semasiological cluster, meanwhile a switch key to proceed to the key selection screen may be provided onto the higher-class selection screen.

In this case, if the image processing apparatus is configured so as not to display an operation mode key on a key selection screen, all the operation mode keys provided on the lower-class key selection screens under the hidden key would be gone automatically, including even frequently-used operation mode keys that are never needed to be prohibited, which could cause a trouble in user-friendliness.

Meanwhile, if the image processing apparatus is configured so as to lose some of the functions exactly as what is requested by a administration-level users, operation mode keys for setting even a frequently-used function may also be gone. As a result, users would suffer from productivity decline and request administration-level users to get them back, and accordingly re-configuration may be required, which also could cause a trouble in user-friendliness.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide image processing apparatuses having improved user-friendliness by preventing an operation mode key to be hidden behind a key selection screen according to the setting changed by an administration-level user or the like, from being actually hidden without any condition.

It is another object of the present invention to provide methods for the image processing apparatuses, having improved user-friendliness by preventing an operation mode key to be hidden behind a key selection screen according to the setting changed by an administration-level user or the like, from being actually hidden without any condition.

It is yet another object of the present invention to provide a computer-readable recording medium having a display control program stored thereon to make a computer of the image processing apparatus implement the methods.

According to a first aspect of the present invention, an image processing apparatus includes:
- a display that is capable of displaying a first key selection screen including one or more than one first operation mode key for setting an operation mode to execute a function of the image processing apparatus, and then, if one of the first operation mode keys is pressed via the first key selection screen, displaying a second key selection screen including one or more than one second operation mode key, which is a lower-class screen under the pressed first operation mode key; and
- a customizing portion that hides at least one of the first and the second operation mode keys on the first key selection screen, according to a user operation, and wherein if a user changes the setting of at least one of the first operation mode keys on the first key selection screen, from display to non-display, while there exists a second operation mode key preliminarily prohibited from being hidden, on the second key selection screen that is a lower-class screen under the first operation mode key to be hidden according to the changed setting, the customizing portion does not hide the first operation mode key against the changed setting.

According to a second aspect of the present invention, a method for an image processing apparatus includes:
- displaying a first key selection screen including one or more than one first operation mode key for setting an operation mode to execute a function of the image processing apparatus, and then, if one of the first operation mode keys is pressed via the first key selection screen, displaying a second key selection screen including one or more than one second operation mode key, which is a lower-class screen under the pressed first operation mode key; and
- hiding at least one of the first and the second operation mode keys on the first key selection screen, according to a user operation, and wherein if a user changes the setting of at least one of the first operation mode keys on the first key selection screen, from display to non-display, while there exists a second operation mode key preliminarily prohibited from being hidden, on the second key selection screen that is a lower-class screen under the first operation mode key to be hidden according to the changed setting, the customizing portion does not hide the first operation mode key against the changed setting.

According to a third aspect of the present invention, a non-transitory computer-readable recording medium has a display control program stored thereon to make a computer of an image processing apparatus execute:
- displaying a first key selection screen including one or more than one first operation mode key for setting an operation mode to execute a function of the image processing apparatus, and then, if one of the first operation mode keys is pressed via the first key selection screen, displaying a second key selection screen including one or more than one second operation mode key, which is a lower-class screen under the pressed first operation mode key; and
- hiding at least one of the first and the second operation mode keys on the first key selection screen, according to a user operation, and wherein if a user changes the setting of at least one of the first operation mode keys on the first key selection screen, from display to non-display, while there exists a second operation mode key preliminarily prohibited from being hidden, on the second key selection screen that is a lower-class screen under the first operation mode key to be hidden according to the changed setting, the customizing portion does not hide the first operation mode key against the changed setting.

According to a fourth aspect of the present invention, an image processing apparatus includes:
- a display that is capable of displaying a key selection screen including one or more than one operation mode key for setting an operation mode to execute a function of the image processing apparatus;
- a memory that stores a use history of the operation mode keys; and
- a customizing portion that hides at least one of the operation mode keys on the key selection screen, according to a user operation, and wherein if a user changes the setting of at least one of the operation mode keys on the key selection screen, from display to non-display, while the operation mode key to be hidden according to the changed setting has been used before as proved in the use history stored on the memory, the customizing portion does not hide the operation mode key against the changed setting.

According to a fifth aspect of the present invention, a method for an image processing apparatus includes:
- displaying a key selection screen including one or more than one operation mode key for setting an operation mode to execute a function of the image processing apparatus;
- storing a use history of the operation mode keys; and
- hiding at least one of the operation mode keys on the key selection screen, according to a user operation, and wherein if a user changes the setting of at least one of the operation mode keys on the key selection screen, from display to non-display, while the operation mode key to be hidden according to the changed setting has been used before as proved in the use history stored on the memory, the customizing portion does not hide the operation mode key against the changed setting.

According to a sixth aspect of the present invention, a non-transitory computer-readable recording medium has a display control program stored thereon to make a computer of an image processing apparatus execute:
- displaying a key selection screen including one or more than one operation mode key for setting an operation mode to execute a function of the image processing apparatus;
- storing a use history of the operation mode keys; and
- hiding at least one of the operation mode keys on the key selection screen, according to a user operation, and wherein if a user changes the setting of at least one of the operation mode keys on the key selection screen, from display to non-display, while the operation mode key to be hidden according to the changed setting has been used before as proved in the use history stored on the memory, the customizing portion does not hide the operation mode key against the changed setting.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 6 is a view illustrating an administration table holding information of every operation mode key;

FIG. 7 is a view illustrating how the administration table looks after changing the setting of an operation mode key from display to non-display;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described with reference to the accompanying drawings.

Figure 1:
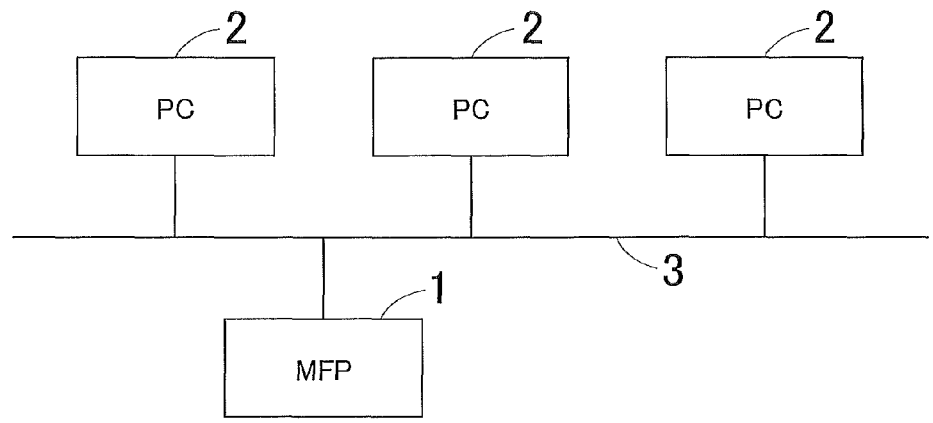
FIG. 1 is a view illustrating a configuration of an image processing system in which an image processing apparatus according to one embodiment of the present invention is employed.

FIG. 1 is a view illustrating a configuration of an image processing system in which an image processing apparatus according to one embodiment of the present invention is employed.

This image processing system includes an image processing apparatus 1 and a client computer (will hereinafter be referred to as PC for short) 2 that is a terminal, connected to each other via a network 3. Receiving an instruction from the PC 2 via the network 3, the image processing apparatus 1 executes a print job accordingly.

In this embodiment, as described above, a multifunctional digital image forming apparatus (will also be referred to as MFP) is employed as the image processing apparatus 1.

Figure 2:
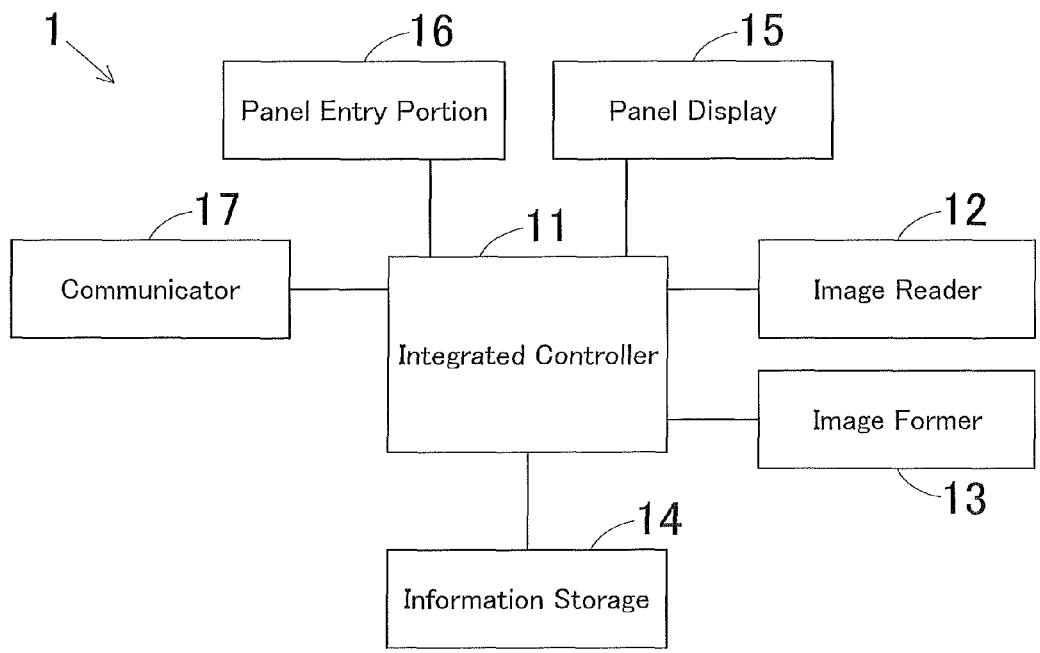
FIG. 2 is a block diagram illustrating en electrical configuration of a MFP employed in the image processing system of FIG. 1, as an image processing apparatus.

FIG. 2 is a block diagram schematically illustrating a configuration of a MFP 1.

This MFP 1 includes an integrated controller 11, a document reader 12, an image former 13, an information storage 14, a panel display 15, a panel entry portion 16 and a communicator 17.

The integrated controller 11 includes a CPU not illustrated in FIG. 2, a RAM provides a work area for the CPU to execute processing, and a ROM stores an operation program and other data, and the like. The integrated controller 11 integrally controls all the operations of the MFP 1. Specifically, in this embodiment, the integrated controller 11 has the customization function allowing customizing a key selection screen displayed on the panel display 15 so that the settings of a user's unnecessary ones from a plurality of operation mode keys currently displayed thereon, can be changed from display to non-display, and the control function making the panel display display/hide operation mode keys.

In this Specification, operation mode keys may simply be referred to as "mode keys".

The document reader 12 reads an image on a document to convert into image data that is electronic data.

The image former 13 prints out image data read out from a document by the document reader 12, print data received from an external machine such as the PC 2, and other data.

The information storage 14 stores for example, settings of operation modes keys, history of jobs, use history of operation mode keys, and the like. It also stores about each mode key, information such as a title of the mode key, whether to display or non-display the mode key, a key selection screen including the mode key, a screen to proceed to when pressing the mode key, and connections with other keys. The information storage 14 further stores various data, such as image data; applications; and the like.

The panel display 15 displays various setting screens, such as key selection screens to be described later, state of the image forming apparatus and a message. It is a liquid crystal display with touch panel functionality.

The panel entry portion 16 is used by users for entry operations. It has hardware keys such as numeric keys, a Start key and a Stop key.

The communicator 17 serves to communicate with external machines such as the PC 2, connected via the network 3 that is a LAN circuit for example.

The following describes how a key selection screen is switched to another one on the panel display 15.

Figure 3:
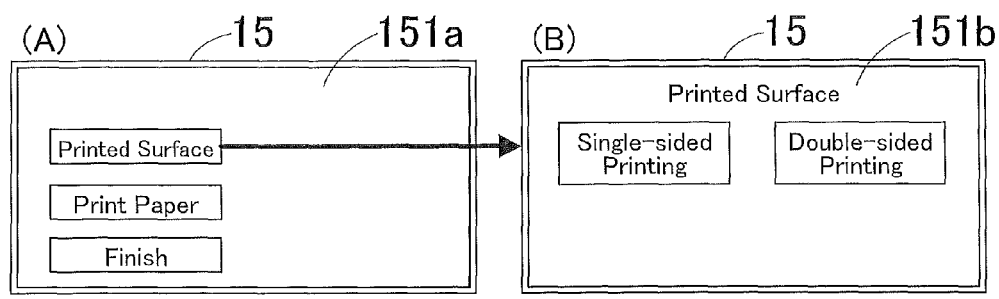
FIG. 3 is a view illustrating how a key selection screen is switched to another one on a display panel.

For example, a key selection screen 151a illustrated as FIG. 3A is displayed on the panel display 15. On this key selection screen 151a, the following three mode keys: a "Printed Surface" key, a "Paper Type" key and a "Finish" key, are displayed.

When a user presses the "Printed Surface" key via the key selection screen 151a, the screen is switched to a key selection screen 151b illustrated as FIG. 3B, which is the lower-class screen under the "Printed Surface" key.

On this key selection screen 151b, a "Single-sided" key and a "Double-sided" key are displayed as options.

As described above, hoping to execute a job using a preferable function, a user calls out a key selection screen including a mode key for setting that function onto the panel display 15, then presses the mode key. If the screen is switched to the lower-class key selection screen under the mode key, the user presses his/her preferable mode key via the lower-class key selection screen to complete setting, then further presses the Start key for example, to start executing a job.

Figure 4:
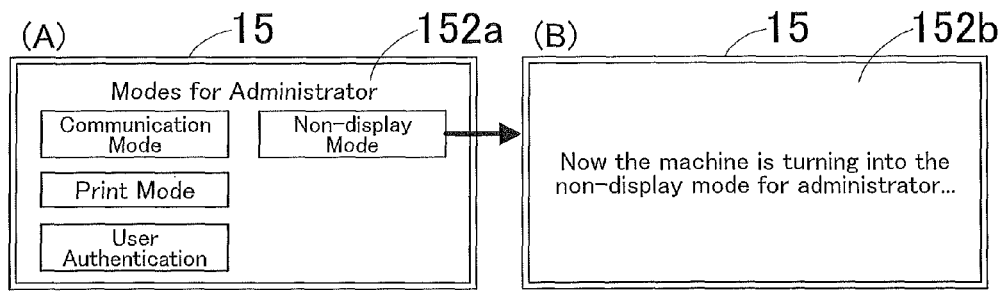
FIG. 4 is a view to describe how to enable the non-display setting mode for administrators.

Here is a case, in which an administration-level user or the like hopes to customize an arbitrary key selection screen by changing the setting of an unnecessary mode key provided thereon, from display to non-display. In such a case, he/she calls out an administration mode screen 152a illustrated as FIG. 4A onto the panel display 15, then presses a "Non-display Setting Mode" key. And then, the MFP 1 turns to the non-display setting mode, switching the screen to a screen 152b illustrated as FIG. 4B.

Figure 5:
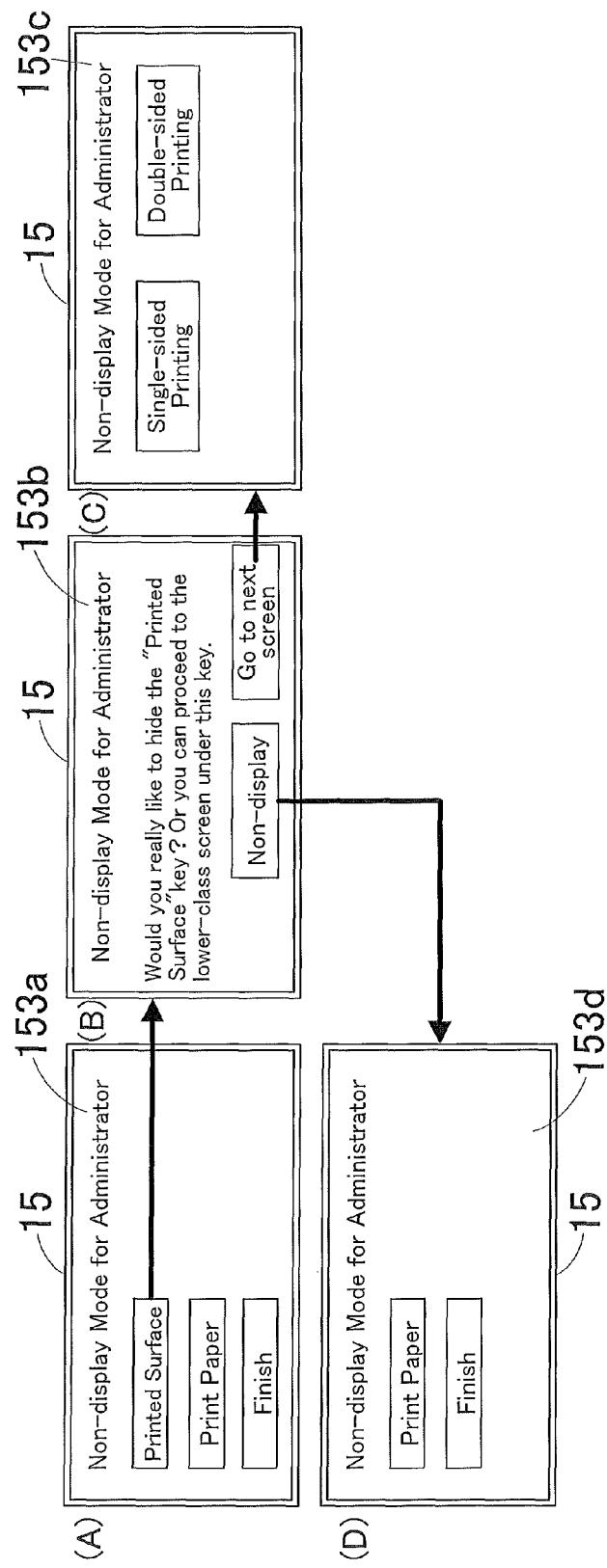
FIG. 5 is a view to describe how screens are switched from one to another on the panel display generally, while changing the setting of an operation mode key from display to non-display.

For example, hoping to change the setting of the "Printed Surface" key provided onto the key selection screen 151a illustrated as FIG. 3A, from display to non-display, he/she calls out a key selection screen 153a illustrated as FIG. 5A onto the panel display 15, then presses the "Printed Surface" key. And then, the screen is switched to an intermediate screen 153b illustrated as FIG. 5B. On this screen 153b, in addition to a "Non-display" key and a "Go to next screen" key, a message asking whether to hide the "Printed Surface" key or to proceed to the lower-class screen under the key, is displayed.

Subsequently, with pressing the "Non-display" key via the intermediate screen 153b, the screen is switched to a customized screen 153d illustrated as FIG. 5D. As the customized screen 153d demonstrates, the "Printed Surface" key is gone, proving that the changed setting is properly accepted, while the "Paper Type" key and the "Finish" key are still there. Since the "Printed Surface" key is not displayed, as a matter of course, users are not allowed to use the "Single-sided" key and the "Double-sided" key provided onto the lower-class key selection screen under the "Printed Surface" key. In other words, the MFP 1 does not allow using the "Printed Surface" function.

Back to the operation, with pressing the "Go to next screen" key via the intermediate screen 153b, the screen is switched to a key selection screen 153c illustrated as FIG. 5C, which is the lower-class screen under the key. Subsequently, the administration-level user presses either the "Single-sided" key or the "Double-sided" key via the key selection screen 153c, and the screen is switched to another one asking whether or not to change the setting of the pressed key from display to non-display. And selecting the "Non-display" key, the screen is switched to a customized one where the key is gone so that he/she can check it out.

In this way, administration-level users or the like can change the setting of their preferable key from display to non-display.

FIG. 6 illustrates an administration table collectively holding various information of every mode key. This administration table is stored on the information storage 14. In this embodiment, there are some records of mode keys, organized in the following attributes: "Key ID", "Key Name", "Screen", "Lower-class Screen", "Display/Non-display" and "Function Group".

"Key ID" refers to an identifier given to the mode key, and "Key Name" refers to a title given to the mode key and displayed on a key selection screen. "Screen" refers to an identifier to identify a key selection screen including the mode key. Mode keys with the same number will be displayed on the same key selection screen. Accordingly, in this embodiment, the "Printed Surface" key with the key ID 1, the "Paper Type" key with the key ID 2 and the "Finish" key with the key ID 3 will be displayed all together on a key selection screen identified by the circled number 1. Meanwhile, the "Single-sided" key with the key ID 4 and the "Double-sided" key with the key ID 5 will be displayed together on a key selection screen identified by the circled number 2.

"Lower-class Screen" refers to an identifier to identify a screen to be displayed next when pressing a mode key, in other words, it refers to information to identify a lower-class key selection screen under a mode key. In this embodiment, with pressing the "Printed Surface" key, the screen is switched to another one identified by the circled number 2, on which the "Single-sided" key with the mode key ID 4 and the "Double-sided" key with the mode key ID 5 are displayed together.

"Display/Non-display" refers to information whether or not to display a mode key.

"Function Group" refers to information representing a function group that a mode key belongs to. Mode keys in the same function group have the same group name as recorded in this column. In this embodiment, the "Printed Surface" key with the mode key ID 1, the "Single-sided" key with the mode key ID 4 and the "Double-sided" with the mode key ID 5 belong to the same function group, "A".

"Function Group", as further described below, serves as a criterion to judge whether or not to accept the setting of a mode key displayed on a key selection screen, having been changed from display to non-display by a user. Mode keys are preliminarily organized in groups by an administration-level user or the like.

As illustrated in FIG. 6, the "Printed Surface" key with the mode key ID 1 is displayed on a screen indicated by the circled number 1, and when pressing this key, the screen will be switched to another one indicated by the circled number 2. This key belongs to the function group, "A". The "Print Paper" key with the mode key ID 2 is displayed on the screen indicated by the circled number 1, and when pressing this key, the screen will be switched to another one indicated by the circled number 3. This key belongs to the function group, "B". The "Finish" key with the mode key ID 3 is displayed on the screen indicated by the circled number 1, and when pressing this key, the screen will be switched to another one indicated by the circled number 4. This key belongs to the function group, "C". The "Single-sided" key with the mode key ID 4 and the "Double-sided" with the mode key ID 5 are displayed on the screen indicated by the circled number 2, and even when pressing these keys, the screen won't be switched any more. These keys belong to the function group, "A".

When an administration-level user or the like selects his/her target key and changes the setting of the key from display to non-display, the administration table illustrated as FIG. 6 will become up-to-date accordingly. For example, when the setting of the "Printed Surface" key with the mode key ID 1 is changed from display to non-display, this mode key's value in the item "Display/Non-display" in the administration table will be changed from "Display" to "Non-display", as illustrated in FIG. 7.

After changing the setting as described above, the "Printed Surface" key with the mode key ID 1 is not displayed on the key selection screen indicated by the circled number 1, and there is no way that users can press this key. As a matter of course, the screen will never be switched to the one indicated by the circled number 3. As a result, there is no way that users can press the "Single-sided" key with the mode key ID 4 and the "Double-sided" key with the mode key ID 5.

Meanwhile, if an administration-level user changes the setting of a mode key, from display to non-display, while the lower-class key selection screen under this mode key includes a mode key for setting a function intended by a general user who is not administration-level, this user will never be able to call out the lower-class key selection screen, and since that goes in an automatic manner, there is no way that he/she can use the target mode key.

To resolve this, in this embodiment, if a user customizes a key selection screen by changing the setting of a mode key for setting a function, from display to non-display, while the lower-class key selection screen under this mode key includes a mode key for setting a different function, the MFP 1 will switch the screen to a warning one with the changed setting being on hold.

Here, it is judged whether or not the function assigned to the mode key to be hidden according to the changed setting is different from the one assigned to the mode key included in the lower-class key selection screen under the mode key to be hidden itself, based on their function groups in the administration table illustrated in FIGS. 6 and 7. For example, as described above, the "Printed Surface" key with the mode key ID 1, the "Single-sided" key with the mode key ID 4 and the "Double-sided" key with the mode key ID 5 belong to the function group, "A", serving to set the same function. This means that the mode keys serve to set a different function from those of the other mode keys: the "Printed Surface" key with the mode key ID 1, the "Print Paper" key with the mode key ID 2 and the "Finish" key with the mode key ID 3.

Figure 8:
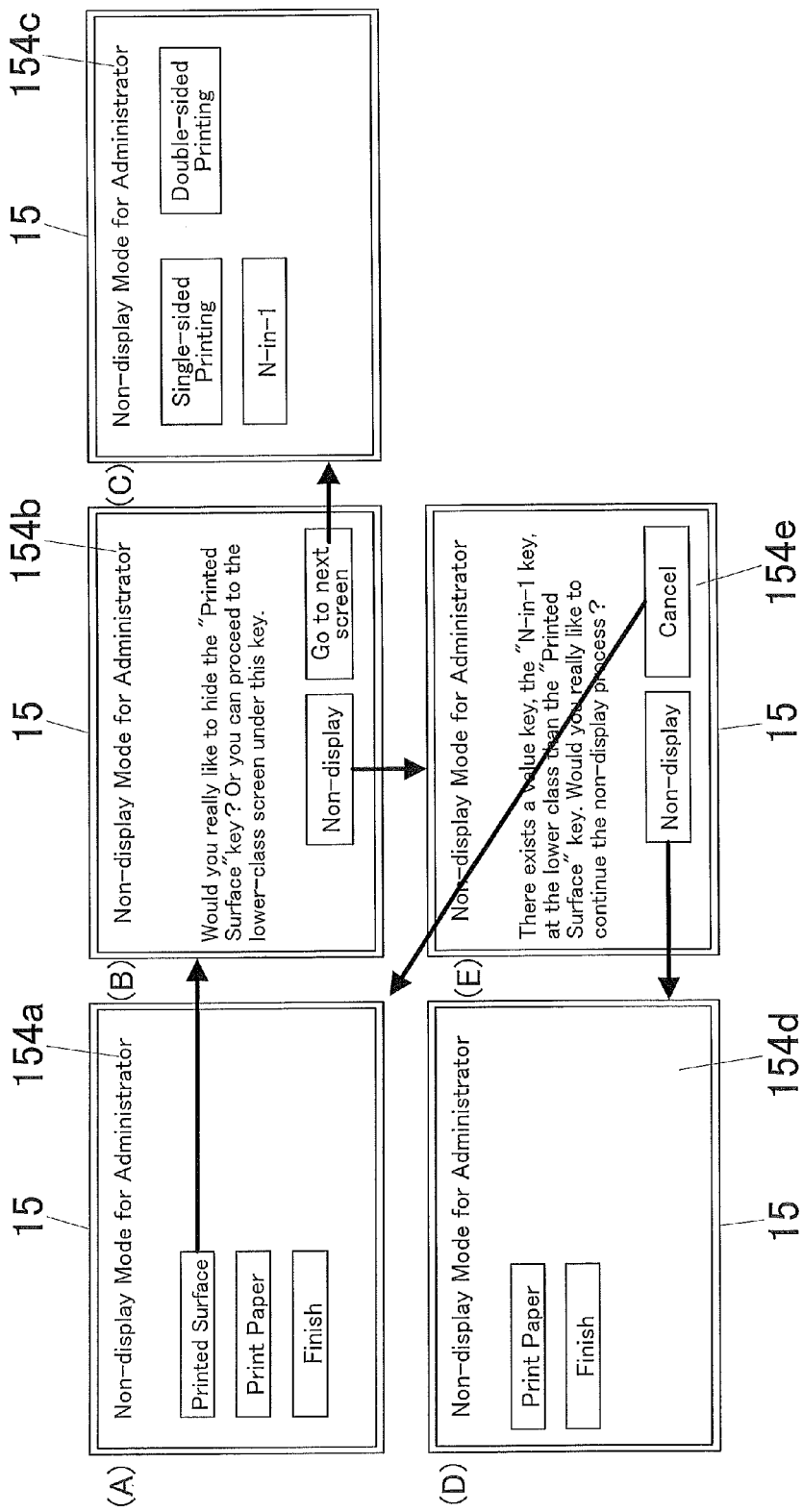
FIG. 8, relating to one embodiment of the present invention, is a view to describe how screens are switched from one to another on the panel display while changing the setting of an operation mode key from display to non-display.

FIG. 8 is a view to describe how a warning screen is called out onto the panel display if a user changes the setting of a mode key for setting a function, from display to non-display, while the lower-class key selection screen under the mode key includes a mode key for setting a different function.

As illustrated in FIG. 8A, a key selection screen 154a is called out onto the panel display 15 in the non-display setting mode for administrators. Now the "Printed Surface" key is pressed to be hidden, via the screen 154a. And then, the screen is switched to an intermediate screen 154b illustrated as FIG. 8B. On this screen 154b, in addition to the "Non-display" key and the "Go to next screen" key, a message asking whether to hide the "Printed Surface" key or to proceed to the lower-class screen under the key, is displayed. In this example, the "Single-sided" key, the "Double-sided" key and the "N-in-1" key are displayed on the key selection screen 154c that is the lower-class screen under the "Printed Surface" key, as illustrated in FIG. 8C. Among these mode keys, only the "N-in-1" key belongs to a function group different from that of the "Printed Surface" key. The "N-in-1" key is a mode key for setting a print function, having a plurality of pages of image data printed out collectively onto one page of paper.

With pressing the "Non-display" key via the intermediate screen 154b, the MFP 1 switches the screen to a warning screen 154e illustrated as FIG. 8E, since there exists at the lower class than the "Printed Surface" key to be hidden according to the changed setting, the "N-in-1" key that belongs to a function group different from that of the "Printed Surface" key. On this warning screen 154e, the "Non-display" key and the "Cancel" key are displayed as well as a message telling that there exists a mode key that belongs to a function group different from that of the "Printed Surface" key, and also a message asking whether to go with or to cancel the changed setting.

When a user presses the "Cancel" key, the screen 154a illustrated as FIG. 8A will be back onto the panel display. Meanwhile, when a user presses the "Non-display" key, the screen will be switched to a customized screen 154d illustrated as FIG. 8D. As the customized screen 154d demonstrates, the "Printed Surface" key is gone, proving that the changed setting is properly accepted, while the "Paper Type" key and the "Finish" key are still there.

Back to the operation, with pressing the "Go to next screen" key via the intermediate screen 154b, the screen is switched to a key selection screen 154c illustrated as FIG. 8C, which is the lower-class screen under the key.

As described above, in this embodiment, if there exists at the lower class than the mode key to be hidden according to the changed setting, a mode key that belongs to a function group different from that of the mode key to be hidden itself, a warning screen will be called out onto the panel display 15 so that administration-level users and the like can easily know that. And then, they can arbitrarily select whether to go with or to cancel the changed setting via the warning screen, and when selecting to go with the changed setting, the mode key will be hidden accordingly, fulfilling their intention.

In an example of FIG. 8, key selection screens are organized in a tree structure having two classes. However, key selection screens may be organized in a tree structure having three or more classes, and if there exists at either of the lower classes than the mode key to be hidden according to the changed setting, a mode key that belongs to a function group different from that of the mode key to be hidden itself, a warning screen will also be called out in the same way.

Figure 9:
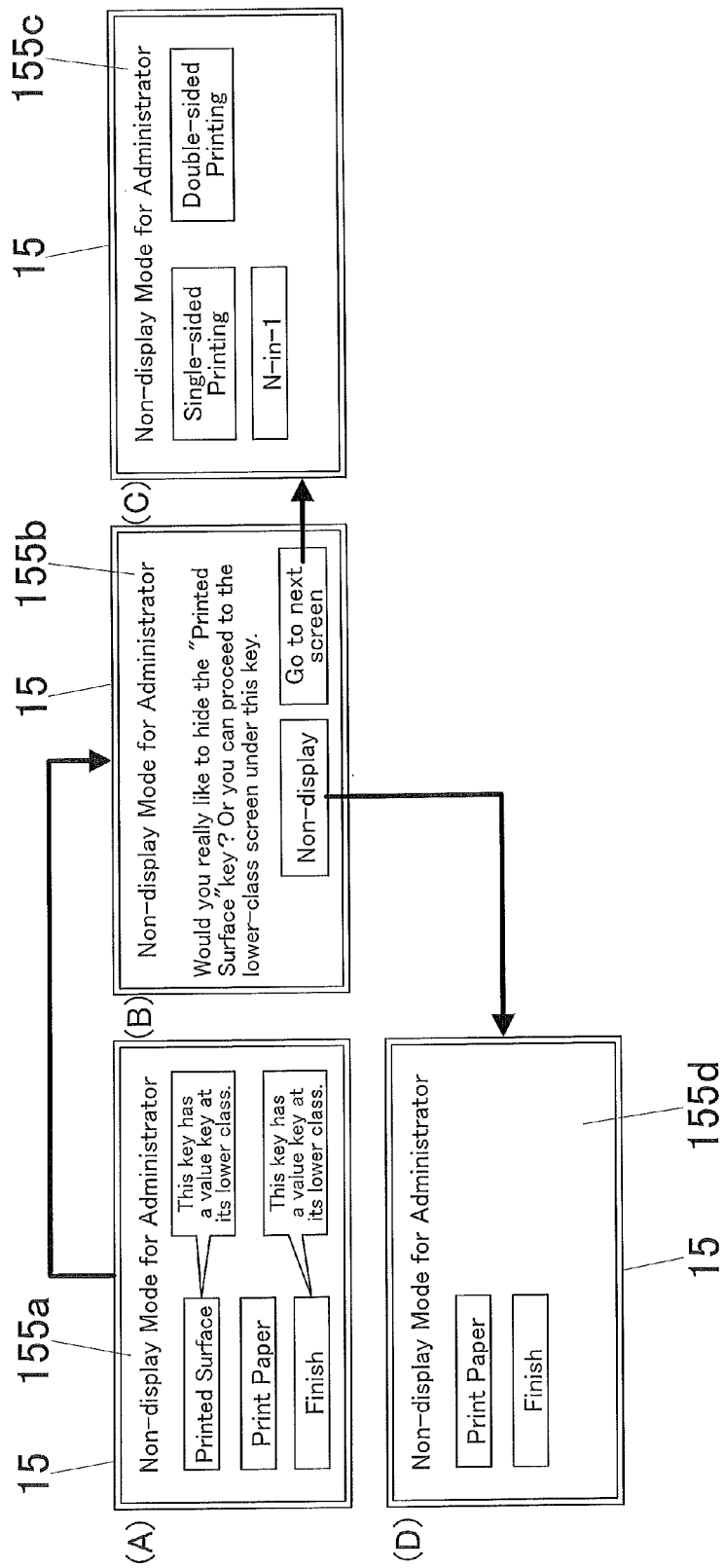
FIG. 9, relating to another embodiment of the present invention, is a view to describe how screens are switched from one to another on the panel display while changing the setting of an operation mode key from display to non-display.

FIG. 9 is a view to describe another example of a warning screen.

A key selection screen 155a, illustrated as FIG. 9A, is displayed with warning messages on the panel display 15. More specifically, with putting the mouse pointer over a mode key that belongs to a function group, which is the "Printed Surface" key, the "Print Paper" key or the "Finish" key, via the key selection screen 155a, if there exists at the lower class than the mode key to be hidden according to the changed setting, a mode key (referred to as "value key" in FIG. 9) that belongs to a function group different from that of the mode key to be hidden itself, a pull-down menu or a balloon is popped up with a warning message being therein so that users can know that.

With selecting the "Printed Surface" key via the key selection screen 155a illustrated as FIG. 9A, the screen is switched to an intermediate screen 155b illustrated as FIG. 9B. With selecting the "Non-display" key via the intermediate screen 155b, the screen is directly switched to a customized screen illustrated as FIG. 9D, not to the warning screen illustrated as FIG. 8E.

Figure 10:
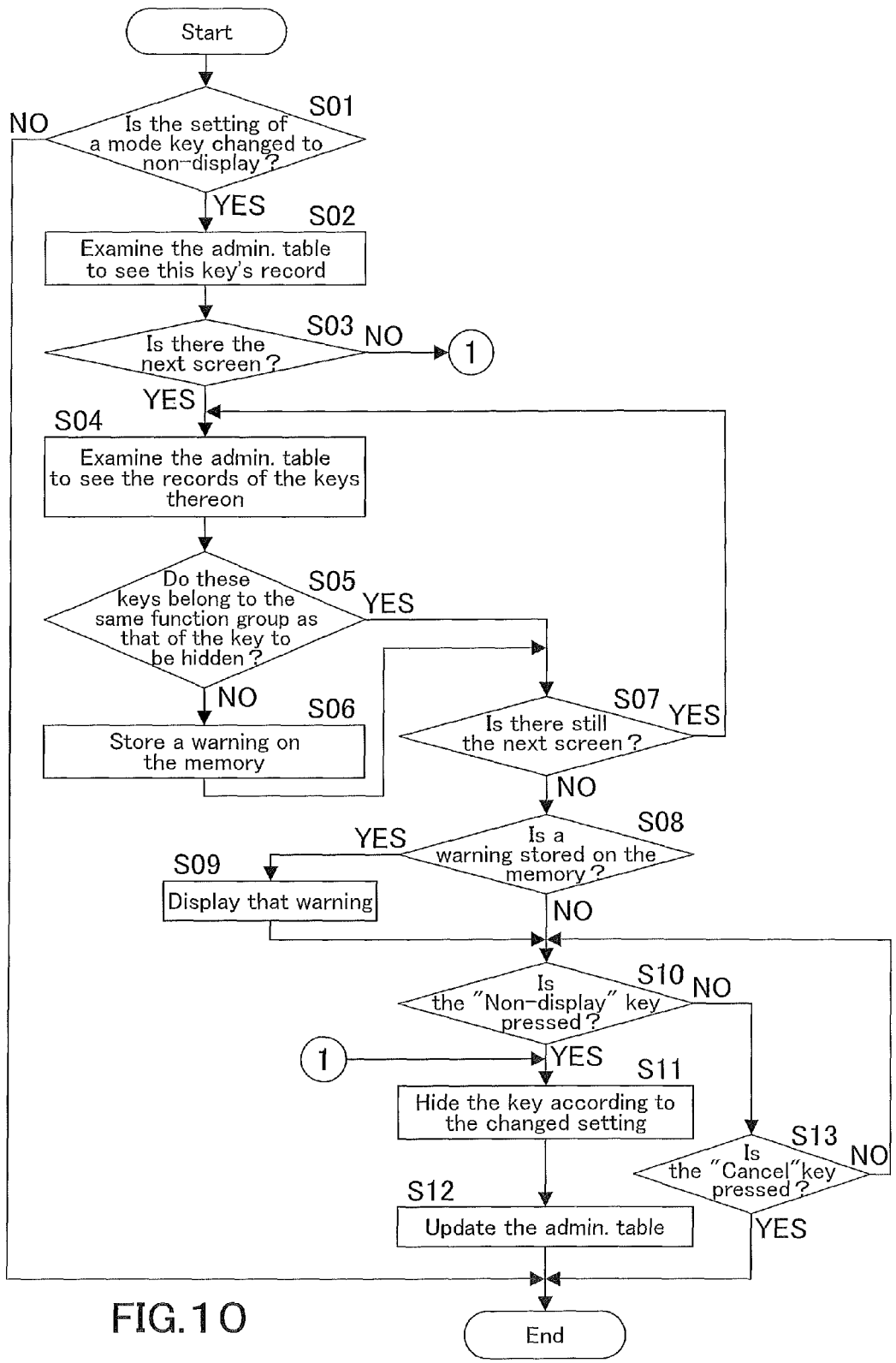
FIG. 10 is a flowchart representing a processing routine executed by the image processing apparatus to display a warning screen illustrated in FIGS. 8 and 9.

FIG. 10 is a flowchart representing a processing routine executed by the MFP 1 to display the warning screen illustrated in FIGS. 8 and 9. More specifically, the processing routine is executed by a CPU of the integrated controller 11 of the MFP 1, not illustrated in this Figure, according to an operation program stored on a recording medium such as a ROM not illustrated in this Figure, or the information storage 14.

In Step S01, it is judged whether or not the setting of a mode key is changed from display to non-display, by an administration-level user or the like. If it is not changed that way (NO in Step S01), the routine immediately terminates. If it is changed that way (YES in Step S01), the administration table is examined to see the mode key's record in Step S02, and it is judged in Step S03, whether or not there is the next screen that is a first lower-class key selection screen under the mode key.

If there is no such screen (NO in Step S03), the mode key is hidden in Step S11, and the administration table is updated in Step S12. If there is such a screen (YES in Step S03), the table is examined to see which function groups the mode keys provided onto the next screen belong to, in Step S04.

And in Step S05, it is judged whether or not the mode keys provided onto the next screen belong to the same function group as that of the mode key to be hidden according to the changed setting. If these mode keys belong to the same function group (YES in Step S05), the routine goes to Step S07. If these mode keys do not belong to the same function group (NO in Step S05), a warning message is stored on the memory (the information storage 14) in Step S06, and then the routine goes to Step S07.

In Step S07, it is judged whether or not there still is the next screen that is a second lower-class key selection screen under any of the mode keys provided onto the first lower-class key selection screen. If there is such a screen (YES in Step S05), the routine goes back to Step S04 to repeat from Steps S04 to S08. If there is no such screen (NO in Step S07), the routine goes to Step S08.

In Step S08, it is judged whether or not there stored a warning message in the memory. If there stored no warning message (NO in Step S08), the routine goes to Step S10. If there stored a warning message (YES in Step S08), it is displayed on the panel display 15 in Step S09, and then the routine goes to Step S10. In Step S10, it is judged whether or not the "Non-display" key is pressed. If it is pressed (YES in Step S10), the setting changed in Step S01 is accepted and the mode key is hidden in Step S11, and the mode key's value in the item "Display/Non-display" in the administration table is changed from "Display" to "Non-display" in Step S12. After that, the routine terminates.

In Step S10, if the "Non-display" key is not pressed (NO in Step S10), then it is judged in Step S13, whether or not the "Cancel" key is pressed. If it is not pressed (NO in Step S13), the routine goes back to Step S10. If the "Cancel" is pressed (YES in Step S13), the routine immediately terminates without hiding the mode key.

Figure 11:
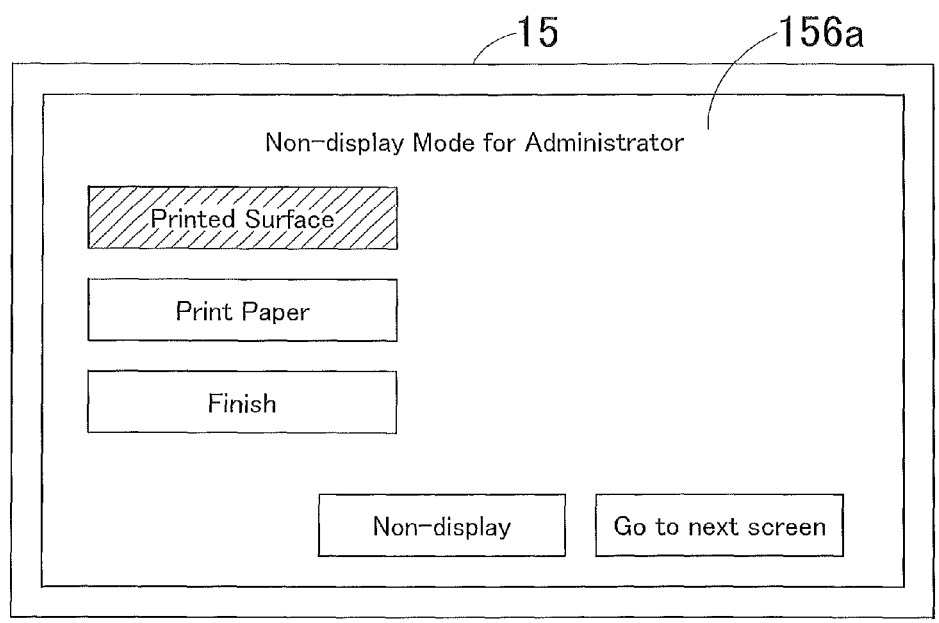
FIG. 11 is a view illustrating a key selection screen when changing the setting of one operation mode key from display to non-display.
Figures 12, 13:
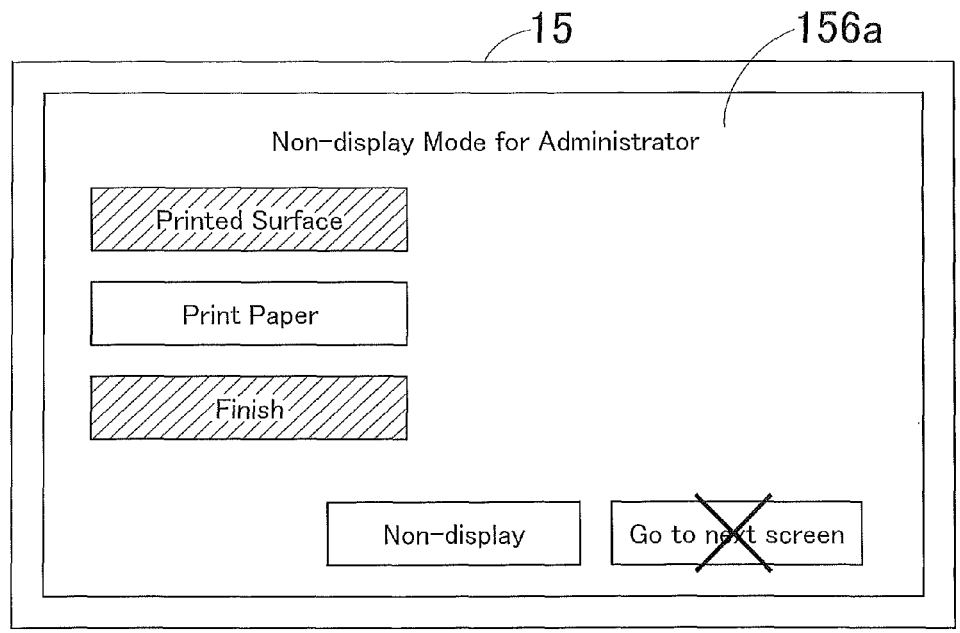
FIG. 12 is a view illustrating a key selection screen when changing the setting of more than one operation mode key from display to non-display.
FIG. 13 is a view illustrating a history table storing records about operation mode keys.

FIG. 11 and FIG. 12 relate to another embodiment of the present invention. In this embodiment, not only the setting of one single mode key can be changed from display to non-display, but also the setting of more than one mode key can be changed from display to non-display, all at once.

FIG. 11 is a view to describe how to change the setting of one mode key from display to non-display, and as illustrated in this Figure, a key selection screen 156a is called out onto the operation panel 15 in the non-display setting mode for administrators. On this screen, the "Non-display" key and the "Go to next screen" key are displayed as well as the "Printed Surface" key, the "Print Paper" key and the "Finish" key. The "Non-display" key serves to accept the setting of a mode key, changed from display to non-display, and the "Go to next screen" key serves to proceed to the lower-class screen under the mode key.

For example, an administration-level user presses the "Printed Surface" key marked with diagonal lines in this Figure. Now the user can select the "Non-display" key or the "Go to next screen" key, whichever. When pressing the "Non-display" key, the "Printed Surface" key will be hidden. When pressing the "Go to next screen" key, the screen will be switched to the lower-class key selection screen under the "Printed Surface" key.

As illustrated in FIG. 12, the following two mode keys: the "Printed Surface" key and the "Finish" key, among the mode keys displayed on the key selection screen 156a, are pressed via the key selection screen 156a. The "Go to next screen" key (with a cross mark as illustrated in FIG. 12) cannot be pressed since it is grayed out here for example, and so the user has only the "Non-display" key to select.

When pressing the "Non-display" key via the screen of FIGS. 11 and 12, the MFP 1 will examine the administration table to see which function groups the mode keys at the lower class than the mode key(s) to be hidden according to the changed setting, belong to. If the mode key(s) to be hidden according to the changed setting and any of the mode keys at the lower class than the mode key(s) to be hidden itself, belong to the same function group, the changed setting will be accepted and the mode key(s) will be hidden accordingly. On the other hand, if the mode key(s) to be hidden according to the changed setting and every mode key at the lower class than the mode key(s) to be hidden itself, belong to different function groups, a warning screen will be called out onto the panel display 15 without hiding the mode key(s).

Figure 14:
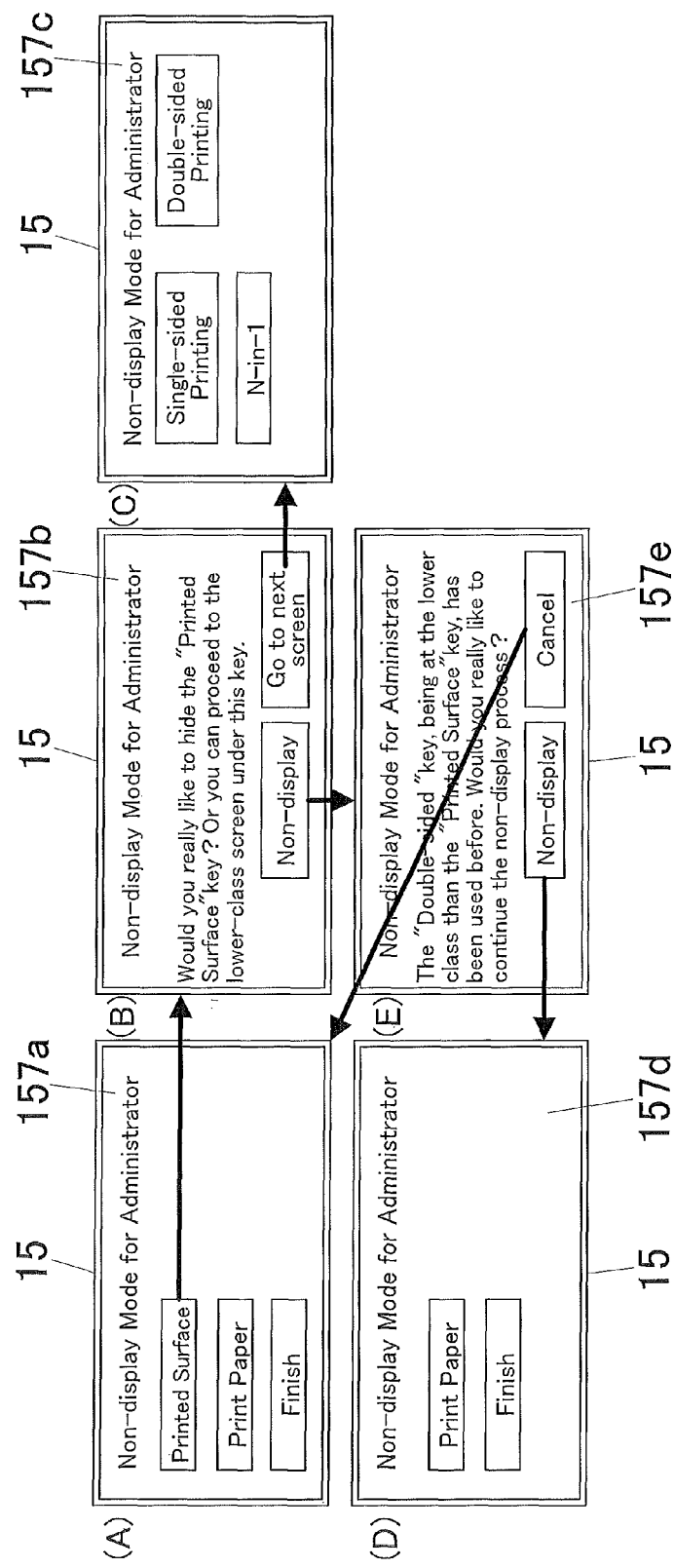
FIG. 14, relating to yet another embodiment of the present invention, is a view to describe how screens are switched from one to another on the panel display while changing the setting of an operation mode key from display to non-display.
Figure 15:
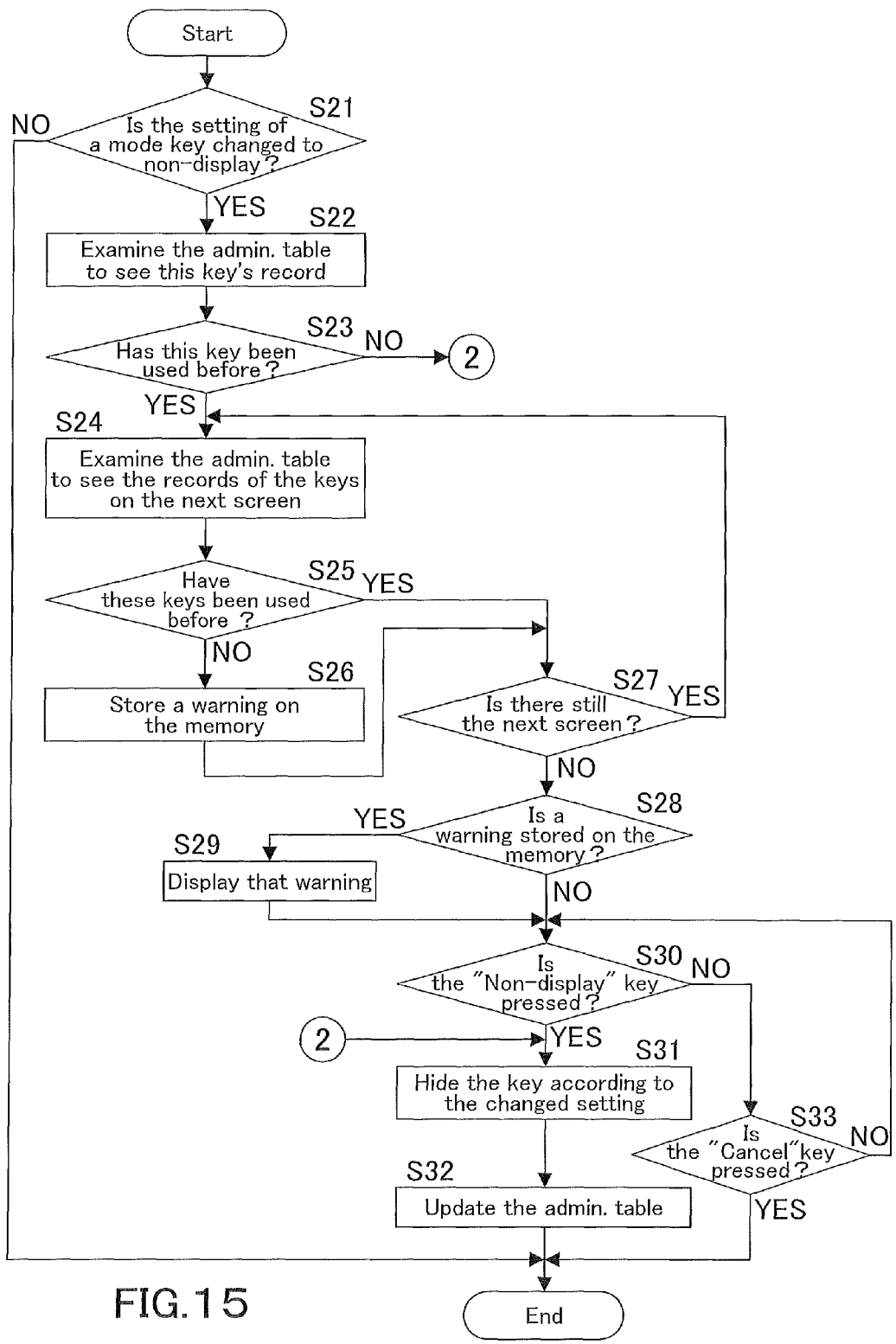
FIG. 15 is a flowchart representing a processing routine executed by the image processing apparatus to display a screen with a warning message, as illustrated in FIG. 14.

FIGS. 13, 14 and 15 relate to yet another embodiment of the present invention. In this embodiment, whether or not to accept the changed setting of a mode key depends on use of the mode key in the past, not on a function group that the mode key belongs to.

A history table holding users' use history of mode keys, which is linked to the administration table, is stored in advance on the MFP 1.

FIG. 13 illustrates such a history table. In this history table, information such as number of times of use, date and time of the last use, and user of the last use is organized by the "Key ID".

According to the example of FIG. 13: the mode key with the key ID 1 has been used 5 times in the past, and it was most lately used on Jan. 6, 2008, by Bob; the mode key with the key ID 2 has never been used before; the mode key with the key ID 3 has been used twice in the past, and it was most lately used on Sep. 12, 2001, by John; the mode key with the key ID 4 has been used 3 times in the past, and it was most lately used on Mar. 26, 2009, by a Public User; and the mode key with the key ID 5 has never been used before.

When a user uses a mode key and performs a print or scanning operation, the MFP 1 will update the history table linked to the administration table; information such as number of times of use, date and time of the last use, and user of the last use is replaced with the latest one.

FIG. 14 is a view to describe how the screen is switched to a warning screen if a mode key at the lower class than the mode key to be hidden according to the changed setting, has been used before.

As illustrated in FIG. 14A, a key selection screen 157*a* is called out onto the panel display 15 in the non-display setting mode for administrators. Now the "Printed Surface" key is pressed to be hidden, via the screen 157*a*. And then, the screen is switched to an intermediate screen 157*b* illustrated as FIG. 14B. On this screen 157*b*, in addition to the "Non-display" key and the "Go to next screen" key, a message asking whether to hide the "Printed Surface" key or to proceed to the lower-class screen under the key, is displayed.

With pressing the "Non-display" key via the intermediate screen 157*b*, the screen is switched to a warning screen 157*e* illustrated as FIG. 14E, since there exists a mode key having been used before, at the lower class than the "Printed Surface" key to be hidden according to the changed setting. On this warning screen 157*e*, the "Non-display" key and the "Cancel" key are displayed as well as a message telling that there exists a mode key having been used before, at the lower class than the "Printed Surface" key, and also a message asking whether to go with or to cancel the changed setting.

When a user presses the "Cancel" key, the screen 157*a* illustrated as FIG. 14A will be back onto the panel display. Meanwhile, when a user presses the "Non-display" key, the screen will be switched to a customized screen 157*d* illustrated as FIG. 14D. On the customized screen 157*d*, the "Printed Surface" key is gone, proving that the changed setting is properly accepted, while the "Paper Type" key and the "Finish" key are still there.

Back to the operation, with pressing the "Go to next screen" key via the intermediate screen 154*b*, the screen is switched to a key selection screen 154*c* illustrated as FIG. 8C, which is a lower-class screen under the key.

As described above, in this embodiment, if there exists a mode key having been used before, at the lower class than the mode key to be hidden according to the changed setting, administration-level users and the like can easily know that. And then, they can arbitrarily select whether to go with or to cancel the changed setting via the warning screen, and when selecting to go with the changed setting, the mode key will be hidden accordingly, fulfilling their intention.

Similar to the example with the key selection screen 155*a*, if there exists a mode key having been used before, at the lower class than the "Printed Surface" key, the "Print Paper" key or the "Finish" displayed on the key selection screen 157*a* illustrated as FIG. 9A, a pull-down menu or a balloon may be popped up with a warning message being therein so that users can know that.

FIG. 15 is a flowchart representing a processing routine executed by the MFP 1 to display the warning screen illustrated in FIG. 14. More specifically, the processing routine is executed by a CPU of the integrated controller 11 of the MFP 1, not illustrated in this Figure, according to an operation program stored on a recording medium such as a ROM not illustrated in this Figure, or the information storage 14.

In Step S21, it is judged whether or not the setting of a mode key is changed from display to non-display, by an administration-level user or the like. If it is not changed that way (NO in Step S21), the routine immediately terminates. If it is changed that way (YES in Step S21), the administration table is examined to see the mode key's record in Step S22, and it is judged in Step S23, whether or not the mode key has been used before.

If the mode key has never been used before (NO in Step S23), this means that the mode keys at the lower class than the mode key to be hidden according to the changed setting, has never been used before neither, and so the changed setting is accepted and the mode key is hidden in Step S31. And then, the administration table is updated in Step S32. If the mode key has been used before (YES in Step S23), the administration table is examined to see the records of the mode keys provided onto the next screen (a first lower-class key selection screen under the mode key to be hidden according to the changed setting) in Step S24, and then it is judged in Step S25, whether or not the mode keys provided on the next screen have been used before. If these mode keys have never been used before (NO in Step S25), the routine goes to Step S27. If these mode keys have been used before (YES in Step S25), a warming message is stored on the memory (the information storage 14) in Step S26, and then the routine goes to Step S27.

In Step S27, it is judged whether or not there still is the next screen that is a second lower-class key selection screen under the mode keys provided onto the first lower-class key selection screen. If there is such a screen (YES in Step S27), the routine goes back to Step S24 to repeat from Steps S24 to S27. If there is no such screen (NO in Step S27), then it is judged in Step S28, whether or not there stored a warning message in the memory. If there stored no warning message (NO in Step S28), the routine goes to Step S30. If there stored a warning message (YES in Step S28), it is displayed on the panel display 15 in Step S29, and then the routine goes to Step S30.

In Step S30, it is judged whether or not the "Non-display" key is pressed. If it is pressed (YES in Step S30), the setting changed in Step S21 is accepted and the mode key is hidden in Step S31, and the mode key's value in the item "Display/Non-display" in the administration table is changed from "Display" to "Non-display" in Step S32. After that, the routine terminates.

In Step S30, if the "Non-display" key is not pressed (NO in Step S30), then it is judged in Step S33, whether or not the "Cancel" key is pressed. If it is not pressed (NO in Step S33), the routine goes back to Step S30. If the "Cancel" is pressed (YES in Step S33), the routine immediately terminates without hiding the mode key.

Figure 16:
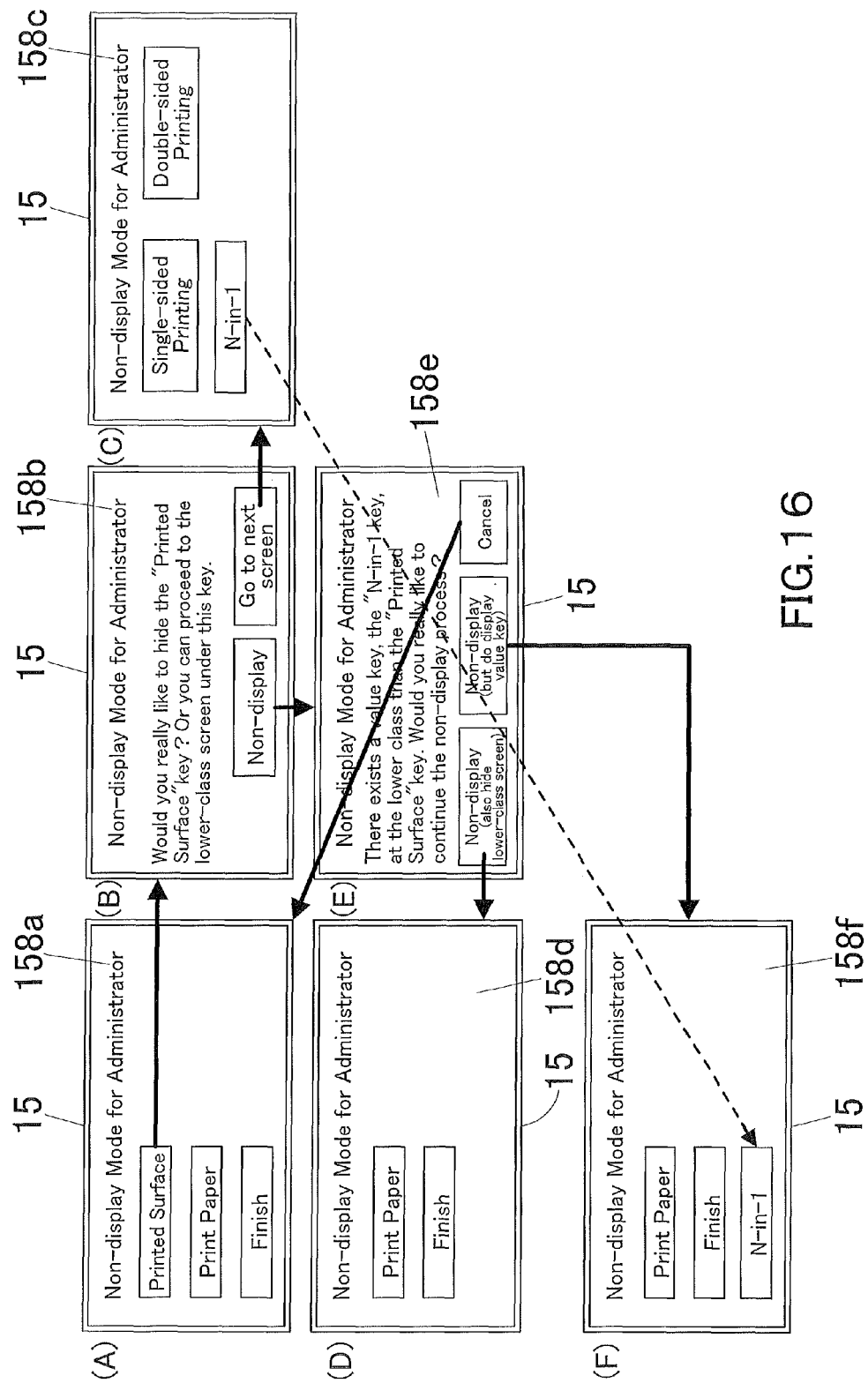
FIG. 16, relating to still yet another embodiment of the present invention, is a view to describe how screens are switched from one to another on the panel display while changing the setting of an operation mode key from display to non-display.

FIG. 16 relates to still yet another embodiment of the present invention. In this embodiment, if there exists at the lower class than the mode key to be hidden according to the changed setting, a mode key that belongs to a function group different from that of the mode key to be hidden itself, or a mode key having been used before, such a mode key will be transferred to appear onto the key selection screen on which the mode key to be hidden was displayed by default, while the mode key to be hidden will be gone accordingly.

As illustrated in FIG. 16A, a key selection screen 158*a* is called out onto the panel display 15 in the non-display setting mode for administrators. Now the "Printed Surface" key is pressed to be hidden, via the screen 158*a*. And then, the screen is switched to an intermediate screen 158*b* illustrated as FIG. 16B. On this screen 158*b*, in addition to the "Non-display" key and the "Go to next screen" key, a message asking whether to hide the "Printed Surface" key or to proceed to the lower-class screen under the key, is displayed. In this example, the "Single-sided" key, the "Double-sided" key and the "N-in-1" key are displayed on the key selection screen 158c that is a lower-class screen under the "Printed Surface" key, as illustrated in FIG. 16C. Among these mode keys, only the "N-in-1" key belongs to a function group different from that of the "Printed Surface" key.

With pressing the "Non-display" key via the intermediate screen 158b, the MFP 1 switches the screen to a warning screen 158e illustrated as FIG. 16E, since there exists at the lower class than the "Printed Surface" key to be hidden according to the changed setting, the "N-in-1" key that belongs to a function group different from that of the "Printed Surface" key. On this warning screen 158e, the "Non-display (also hide lower-class screen)" key, the "Non-display (but do display value key)" key and the "Cancel" key are displayed as well as a message telling that there exists a mode key that belongs to a function group different from the "Printed Surface" key, and also a message asking whether to go with or to cancel the changed setting.

When a user presses the "Cancel" key, the screen 158a illustrated as FIG. 16A will be back onto the panel display. Meanwhile, when a user presses the "Non-display (also hide lower-class screen)" key, the screen will be switched to a customized screen 158d illustrated as FIG. 16D. On the customized screen 158d, the "Printed Surface" key is gone, proving that the changed setting is properly accepted, while the "Paper Type" key and the "Finish" key are still there.

When pressing the "Non-display (but do display value key)", the screen will be switched to a customized screen 158f illustrated as FIG. 16F. On the customized screen 158f, the "Printed Surface" is gone, proving that the changed setting is properly accepted, while the "N-in-1" key at the lower class than the "Printed Surface" key appears on the panel display, in addition to the "Paper Type" key and the "Finish" key. And accordingly, the administration table illustrated in FIG. 6 is updated; the "N-in-1" key's value in the item "Screen" is replaced with the latest one.

Back to the operation, with pressing the "Go to next screen" key via the intermediate screen 158b, the screen is switched to the key selection screen 158c illustrated as FIG. 16C, which is a lower-class screen under the key.

Figure 17:
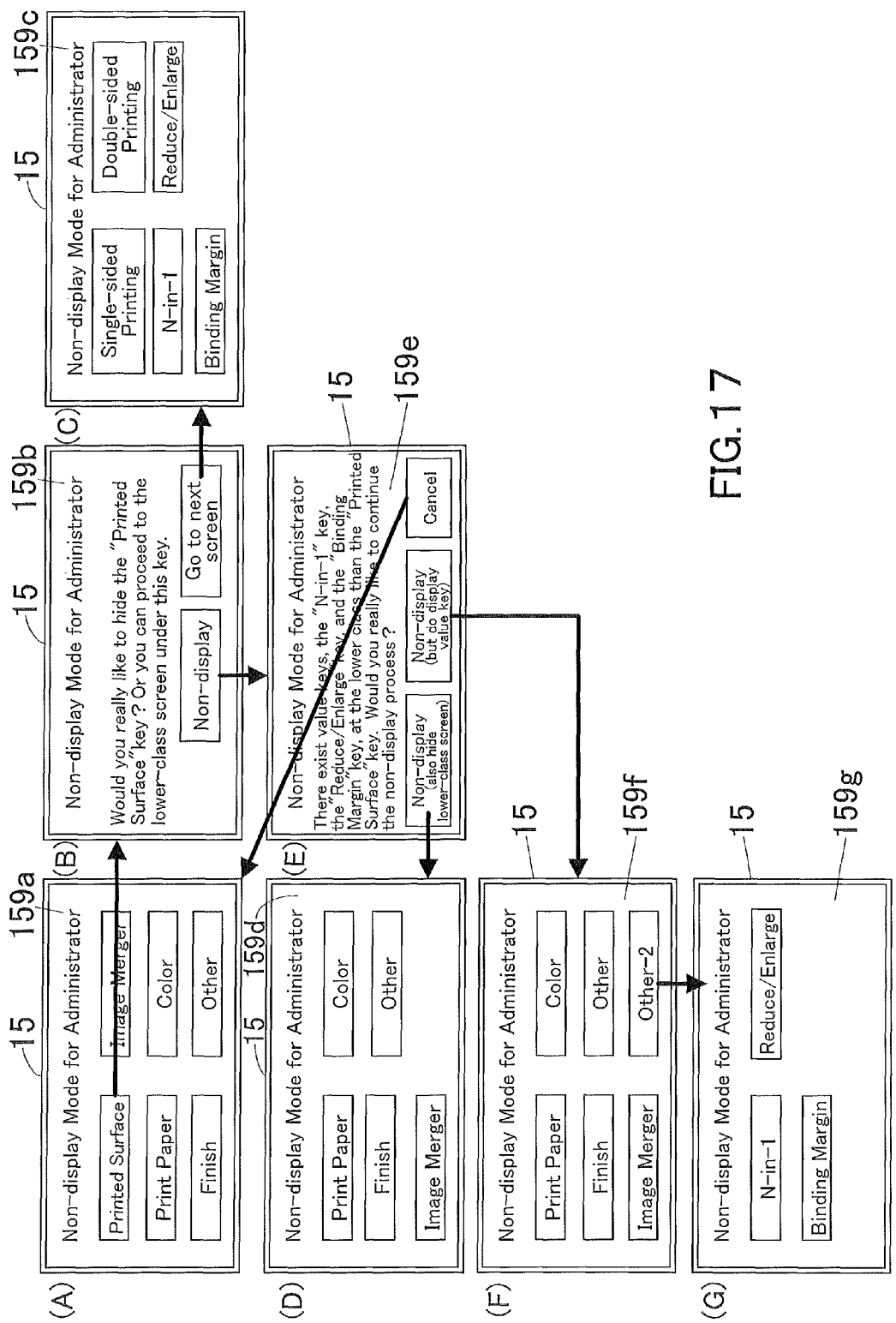
FIG. 17, relating to still yet another embodiment of the present invention, is a view to describe how screens are switched from one to another on the panel display while changing the setting of an operation mode key from display to non-display.

As described above, in this embodiment, if there exists at the lower class than the mode key to be hidden according to the changed setting, a mode key that belongs to a function group different from that of the mode key to be hidden itself, or a mode key having been used before, such a mode key will be transferred to appear onto the key selection screen on which the mode key to be hidden were displayed by default, while the mode key to be hidden will be gone accordingly. FIG. 17 relates to still yet another embodiment of the present invention. In the embodiment of FIG. 16, if there exists at the lower class than the mode key to be hidden according to the changed setting, any mode keys that belong to a function group different from that of the mode key to be hidden itself, or any mode keys having been used before, such mode keys will be transferred to appear onto the upper-class key selection screen. The following embodiment refers to a case, in which the upper-class key selection screen has no sufficient space left for all such mode keys. In this case, all such mode keys will be collected into one folder, and in place of the keys, one key will be displayed on the upper-class key selection screen.

As illustrated in FIG. 17A, a key selection screen 159a is called out onto the panel display 15 in the non-display setting mode for administrators. In this example, on the key selection screen 159a, an "Image Merger" key, a "Color" key and an "Other" key are displayed as well as the "Printed Surface" key, the "Print Paper" key and the "Finish" key.

Now a user presses the "Printed Surface" key to hide, via the screen 159a. And then, the screen is switched to an intermediate screen 159b illustrated as FIG. 17B. On this screen 159b, in addition to the "Non-display" key and the "Go to next screen" key, a message asking whether to hide the "Printed Surface" key or to proceed to the lower-class screen under the key, is displayed. In this example, on a key selection screen 158c illustrated as FIG. 17C, which is the lower-class screen under the "Printed Surface" key, in addition to the "Single-sided" key, the "Double-sided" key and the "N-in-1" key, the "Reduce/Enlarge" key for setting printing magnification and the "Binding Margin" key for setting binding margins are displayed. More specifically, the "N-in-1" key, the "Reduce/Enlarge" key and the "Binding Margin" key belong to a function group different from that of the "Printed Surface" key.

When pressing the "Non-display" key via the intermediate screen 159b, the MFP 1 switches the screen to a warning screen 159e illustrated as FIG. 17E, since there exist at the lower class than the "Printed Surface" key to be hidden according to the changed setting, the "N-in-1" key, the "Reduce/Enlarge" key and the "Binding Margin" key that belong to a function group different from that of the "Printed Surface" key. On this warning screen 159e, the "Non-display (also hide lower-class screen)" key, the "Non-display (but do display value key)" key and the "Cancel" key are displayed as well as a message telling that there exists mode keys that belong to a function group different from the "Printed Surface" key, and also a message asking whether to go with or to cancel the changed setting.

When a user presses the "Cancel" key, the screen 159a illustrated as FIG. 17A will be back onto the panel display. Meanwhile, when a user presses the "Non-display (also hide lower-class screen)" key, the screen will be switched to a customized screen 159d illustrated as FIG. 17D. On the customized screen 159d, the "Printed Surface" key is gone, proving that the changed setting is properly accepted, while the "Paper Type" key, the "Finish" key, the "Image Merger" key, the "Color" key and the "Other" key are still there.

When pressing the "Non-display (but do display value key)" via the warning screen 159e, the screen will be switched to a customized screen 159f illustrated as FIG. 17F. As the customized screen 159f demonstrates, the "Printed Surface" key is gone, proving that the changed setting is properly accepted, while the "Print Paper" key, the "Finish" key, the "Color" key and the "Other" key are still there. Furthermore, specifically in the embodiment of FIG. 17, the "N-in-1" key, the "Reduce/Enlarge" key and the "Binding Margin" key at the lower class than the "Printed Surface" key are supposed to be transferred to appear there, too. However, the customized screen 159f has no sufficient space left for all the three mode keys.

To resolve this, as illustrated in FIG. 17F, the MFP 1 collects all the three mode keys into one folder and display the folder as a mode key named "Other –2".

In this case, when a user presses the "Other –2" key via the key selection screen 159f, the screen will be switched to a key selection screen 159d that is a lower-class screen under the "Other –2" key, on which the "N-in-1" key, the "Reduce/Enlarge" key and the "Binding Margin" key are displayed.

And accordingly, the administration table illustrated in FIG. 6 will be updated; the values of the "N-in-1" key, the "Reduce/Enlarge" key and the "Binding Margin", for example in the item "Screen" are replaced with the latest ones.

Back to the operation, with pressing the "Go to next screen" key via the intermediate screen 159b, the screen is switched to a key selection screen 159c illustrated as FIG. 17C, which is the lower-class screen under the key.

As described above, in this embodiment, if a key selection screen has no sufficient space left for more than one mode key supposed to be transferred to appear onto the key selection screen, a new mode key at the upper level than these mode keys is created and displayed on the key selection screen, which can eliminate the inconvenience that the mode keys cannot be displayed on the key selection screen due to shortage of space.

However, even if a key selection screen has sufficient space left for more than one mode key supposed to be transferred to appear onto the key selection screen, a new mode key at the upper level than these mode keys may be created and displayed on the key selection screen.

Figure 18:
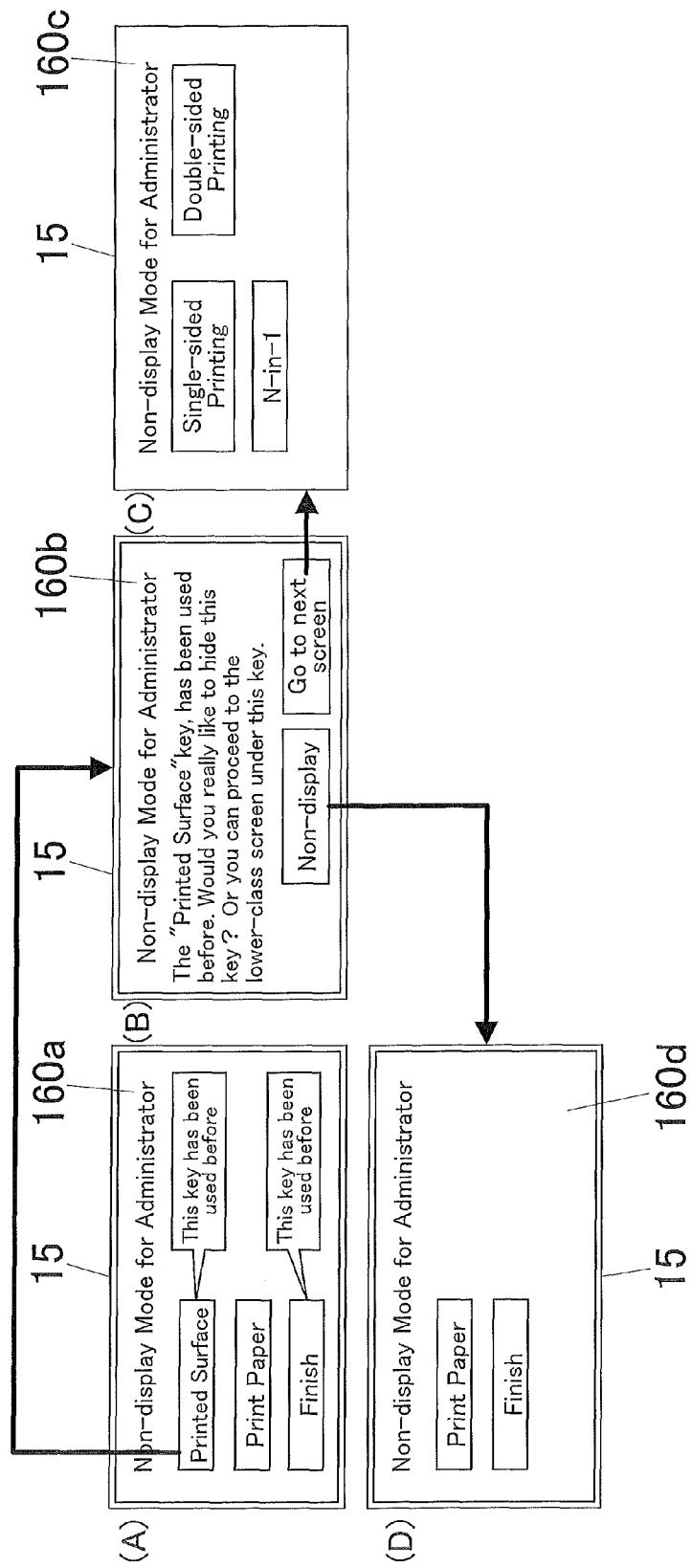
FIG. 18, relating to still yet another embodiment of the present invention, is a view to describe how screens are switched from one to another on the panel display while changing the setting of an operation mode key from display to non-display.

FIG. 18 relates to still yet another embodiment of the present invention.

In this embodiment, if the setting of a mode key on a key selection screen is changed from display to non-display, while the mode key has been used before, a warning screen will be called out onto the panel display without hiding the mode key.

As illustrated in FIG. 18A, a key selection screen 160a is called out onto the panel display 15 in the non-display setting mode for administrators. On this key selection screen 160a, the "Printed Surface" key, the "Print Paper" key and the "Finish" key are displayed. Among these keys, the "Printed Surface" key and the "Finish" key have been used before. With putting the mouse pointer over the "Printed Surface" key or the "Finish" key, a pull-down menu or a balloon is popped up with a warning message being therein so that users can know that.

Now the "Printed Surface" key is pressed to be hidden, via the screen 160a. And then, the screen is switched to an intermediate screen 160b illustrated as FIG. 18B. On this screen 160b, in addition to the "Non-display" key and the "Go to next screen" key, a message asking whether to hide the "Printed Surface" key or to proceed to the lower-class screen under the key, is displayed. In this example, the "Single-sided" key, the "Double-sided" key and the "N-in-1" key are displayed on the key selection screen 160c that is the lower-class screen under the "Printed Surface" key, as illustrated in FIG. 18C.

When a user presses the "Non-display" key, the screen 160d illustrated as FIG. 18D will be back onto the panel display. As the customized screen 160d demonstrates, the "Printed Surface" key is gone, proving that the changed setting is properly accepted, while the "Paper Type" key and the "Finish" key are still there.

Back to the operation, with pressing the "Go to next screen" key via the intermediate screen 160b, the screen is switched to a key selection screen 160c illustrated as FIG. 18C, which is the lower-class screen under the key.

Meanwhile, when pressing the "Non-display" key is pressed via the intermediate screen 160b illustrated as FIG. 18B, a warning screen may be called out on the panel display.

As described above, in this embodiment, if a mode key to be hidden according to the changed setting has been used before, a warning screen will be called out onto the panel display 15 so that administration-level users and the like can easily know that. And then, they can arbitrarily select whether to go with or to cancel the changed setting via the warning screen, and when selecting to go with the changed setting, the mode key will be hidden accordingly, fulfilling their intention.

That is all about the embodiments of the present invention. However, the present invention should not be limited to the embodiments described above.

For example, a mode key prohibited from being hidden, existing at the lower class than the mode key to be hidden according to the changed setting, belongs to the same function group as that of the mode key to be hidden according to the changed setting, or has been used before. However, the present invention should not be limited to this example.

As well as evidence of use, other parameters such as number of times of use, date and time of the last use, and user of the last use may construct a condition for not hiding the mode key against the changed setting. Or alternatively, threshold values stored inside of the MFP 1 may be compared and a result from the comparison may construct such a condition.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus having a memory comprising: a display that is capable of displaying a first key selection screen including one or more than one first operation mode keys for setting an operation mode to execute a function of the image processing apparatus, and then, based on one of the first operation mode keys being pressed via the first key selection screen, displaying a second key selection screen including one or more than one second operation mode keys, which is a lower-class screen under the pressed first operation mode key;
   a customizing portion that hides at least one of the first operation mode keys on the first key selection screen, based on a user operation; and
   a judgment portion that judges whether or not any of the second operation mode keys on the second key selection screen is prohibited from being hidden, the second key selection screen being a lower-class screen to be displayed upon pressing of any of the first operation mode keys, when a user gives instructions to hide at least one of the first operation mode keys on the first key selection screen,
   wherein: if the judgment portion judges that none of the second operation mode keys on the second key selection screen is prohibited from being hidden, the customizing portion hides the at least one first operation mode key on the first key selection screen in accordance with the instructions given by the user and also hides the second operation mode keys on the second key selection screen automatically, the second key selection screen being a lower-class screen to be displayed upon pressing of any of the first operation mode keys; and if the judgment portion judges that any of the second operation mode keys on the second key selection screen is prohibited from being hidden, the customizing portion does not hide the at least one first operation mode key on the first key selection screen against the instructions given by the user, and
   wherein the function of the image processing apparatus is an operation concerning image processing that is executed by the image processing apparatus and that comprises a print operation.

2. The image processing apparatus recited in claim 1, wherein:
   the second operation mode key prohibited from being hidden belongs to a different function group than the first operation mode key to be hidden.

3. The image processing apparatus recited in claim 1, further comprising:
   a memory that stores a use history of the first and the second operation mode keys,
   and wherein:
   the second operation mode key prohibited from being hidden has been used before as proved in the use history stored on the memory.

4. The image processing apparatus recited in claim 1, wherein:
   if there exists the second operation mode key prohibited from being hidden, on the second key selection screen, the customizing portion displays a warning screen on the display when a user changes the setting of at least one of the first operation mode keys.

5. The image processing apparatus recited in claim 4, wherein:
   the warning screen includes a message asking the user to select whether or not to go with the changed setting; and the customizing portion hides the first operation mode key according to the changed setting if his/her intention to go with the changed setting is confirmed.

6. The image processing apparatus recited in claim 5, wherein:
   the customizing portion transfers and displays onto the first key selection screen, the second operation mode key prohibited from being hidden, when hiding the first operation mode key according to the changed setting.

7. The image processing apparatus recited in claim 6, wherein:
   if there exists more than one second operation mode key prohibited from being hidden, the customizing portion creates and displays onto the first key selection screen, a new operation mode key, and then hides the first operation mode key according to the changed setting.

8. The image processing apparatus recited in claim 7, wherein:
   if the first key selection screen has no sufficient space left for the second operation mode keys prohibited from being hidden, the customizing portion creates and displays onto the first key selection screen, a new operation mode key.

9. The image processing apparatus recited in claim 1, wherein:
   each of the displayed second operation mode keys executes a respective function specific to the one first operation mode key.

10. A method of displaying operation mode keys for an image processing apparatus, comprising:
    displaying a first key selection screen including one or more than one first operation mode keys for setting an operation mode to execute a function of the image processing apparatus, and then, based on one of the first operation mode keys being pressed via the first key selection screen, displaying a second key selection screen including one or more than one second operation mode keys, which is a lower-class screen under the pressed first operation mode key;
    hiding at least one of the first operation mode keys on the first key selection screen, based on a user operation; and
    judging whether or not any of the second operation mode keys on the second key selection screen is prohibited from being hidden, the second key selection screen being a lower-class screen to be displayed upon pressing of any of the first operation mode keys, when a user gives instructions to hide at least one of the first operation mode keys on the first key selection screen,
    wherein: if none of the second operation mode keys on the second key selection screen is prohibited from being hidden, the at least one first operation mode key on the first key selection screen is hidden in accordance with the instructions given by the user and the second operation mode keys on the second key selection screen also is hidden automatically, the second key selection screen being a lower-class screen to be displayed upon pressing of any of the first operation mode keys; and if any of the second operation mode keys on the second key selection screen is prohibited from being hidden, the at least one first operation mode key on the first key selection screen is not hidden against the instructions given by the user, and
    wherein the function of the image processing apparatus is an operation concerning image processing that is executed by the image processing apparatus and that comprises a print operation.

11. The method recited in claim 10, wherein:

each of the displayed second operation mode keys executes a respective function specific to the one first operation mode key.

12. A non-transitory computer-readable recording medium having a display control program stored thereon to make a computer of an image processing apparatus execute a method comprising:

displaying a first key selection screen including one or more than one first operation mode keys for setting an operation mode to execute a function of the image processing apparatus, and then, based on one of the first operation mode keys being pressed via the first key selection screen, displaying a second key selection screen including one or more than one second operation mode keys, which is a lower-class screen under the pressed first operation mode key;

hiding at least one of the first operation mode keys on the first key selection screen, based on a user operation; and judging whether or not any of the second operation mode keys on the second key selection screen is prohibited from being hidden, the second key selection screen being a lower-class screen to be displayed upon pressing of any of the first operation mode keys, when a user gives instructions to hide at least one of the first operation mode keys on the first key selection screen, wherein: if none of the second operation mode keys on the second key selection screen is prohibited from being hidden, the at least one first operation mode key on the first key selection screen is hidden in accordance with the instructions given by the user and the second operation mode keys on the second key selection screen also is hidden automatically, the second key selection screen being a lower-class screen to be displayed upon pressing of any of the first operation mode keys; and if any of the second operation mode keys on the second key selection screen is prohibited from being hidden, the at least one first operation mode key on the first key selection screen is not hidden against the instructions given by the user, and wherein the function of the image processing apparatus is an operation concerning image processing that is executed by the image processing apparatus and that comprises a print operation.

13. The non-transitory computer-readable recording medium having a display control program stored thereon recited in claim 12, wherein:

each of the displayed second operation mode keys executes a respective function specific to the one first operation mode key.

\* \* \* \* \*